United States Patent [19]

Sinha et al.

[11] Patent Number: 4,517,242

[45] Date of Patent: May 14, 1985

[54] PROTECTIVE COATING FOR DRY HEAT STERILIZABLE GLASSWARE

[75] Inventors: Kamal R. Sinha, Millville; Brian E. Caldwell, Laurel Lake, both of N.J.

[73] Assignee: Wheaton Industries, Millville, N.J.

[21] Appl. No.: 501,506

[22] Filed: Jun. 6, 1983

Related U.S. Application Data

[63] Continuation-in-part of Ser. No. 486,104, Apr. 18, 1983.

[51] Int. Cl.³ .................. B32B 17/10; B32B 27/28
[52] U.S. Cl. ........................ 428/336; 65/3.43; 65/3.44; 65/60.3; 427/372.2; 427/385.5; 427/389.7; 428/431; 428/440; 428/441; 428/442
[58] Field of Search .......... 428/431, 441, 440, 442, 428/336; 65/60.3, 3.43, 3.44; 427/372.2, 385.5, 389.7

[56] References Cited

U.S. PATENT DOCUMENTS

| | | | |
|---|---|---|---|
| 3,488,215 | 6/1970 | Shepard | 428/441 |
| 3,939,108 | 2/1976 | Sirota | 428/441 |
| 3,959,539 | 5/1976 | Waggoner | 428/441 |
| 4,065,589 | 12/1977 | Lerrard | 428/441 |
| 4,065,590 | 12/1977 | Salensky | 428/441 |
| 4,131,529 | 12/1978 | Osterloh | 428/441 |
| 4,168,345 | 9/1979 | de Massey | 428/441 |
| 4,250,068 | 2/1981 | Ali-Zaidi | 428/431 |

*Primary Examiner*—Ellis P. Robinson
*Attorney, Agent, or Firm*—Ratner & Prestia

[57] ABSTRACT

Method and coating composition for coating newly formed glass at relatively low temperature and without prior "hot end" treatment. In this method, the composition is applied in a conventional manner by spray, dip, or roller coating, the composition comprising a carboxylic functional resin in dilute aqueous solution, the solution also including a lubricity-imparting additive. The carboxylic functionality of the resin renders it water dispersible and also renders the finished coating receptive to conventional label adhesives, decorating printing, and so forth. The use of this composition, without cross-linking of the coating, protects the surface of the glass until sterilization at which time the composition is removed by hot water washing; the treated glassware is then sterilized by exposure to dry heat temperature above 400° F. without surface discoloration.

10 Claims, No Drawings

PROTECTIVE COATING FOR DRY HEAT STERILIZABLE GLASSWARE

BACKGROUND OF THE INVENTION

This is a continuation-in-part of application Ser. No. 486,104, filed Apr. 18, 1983.

The present invention relates to a method and coating composition to provide lubricity and abrasion resistance to the surface of glass. The invention further relates to such a method and composition suitable for application to a bare, freshly formed glass surface without pretreatment and particularly without a prior hot end coating or treatment. Most particularly, this invention pertains to such a coating which is easily removable to permit high temperature dry heat sterilization of the underlying glass surface.

Microscopic scratches on the surface of glass reduce its strength considerably. The very nature of the glass manufacturing and packaging industry, with its high speed and in-line operations, makes it virtually impossible to prevent surface scratching because of the abusive manner in which the glass articles are handled from the time they leave the annealing lehr. In the case of glass containers, they are gauged, packed, transported, filled, capped, re-transported and finally sold to the public for comsumption; these operations generally necessitate rubbing or contacting the glass in a number of ways which results in scratching and in turn a loss of strength.

In an effort to minimize the strength loss from surface scratching and the resulting glass breakage, various attempts have been made in the past to coat the exterior surfaces of glass articles with abrasion resistant coatings of various types. The composition of such coatings include polyethylene waxes, acrylic-ethylene copolymers, complex stearates, fatty acids, polyurethanes, vinyl copolymers and silicones. Such coatings are generally applied after the glass is annealed, therefore these coatings are called cold end coatings. But these cold end coatings are generally effective only in providing abrasion protection on glass surfaces that have been pretreated with a "hot end" coating. Typically, hot end coatings are formed by depositing a pyrolyzable titanium or tin compound which chemically decomposes upon heating to form corresponding oxides of the metal on the glass surface while the surface is at a temperature above the pyrolyzing temperature of the compound. The hot end surface treatment does not offer increased protection or lubricity when used by itself but merely alters the composition of the bonding surface and allows the prior art cold end coating to form a uniform durable film.

Such hot end—cold end coating combinations have been in use for many years in the glass container industry. The use of hot end surface treatment is an added expense and requires expensive exhaust systems with special stacks and scrubbers to remove the toxic and corrosive vapors produced from the decomposition products of hot end coating compositions. Another problem commonly encountered is an undesirable silvery appearance on hot end treated glassware due to the excess metal oxide deposited on the surface.

Additionally, many individual prior art glass treating compositions have specific objectionable characteristics. For example, oleic acid, stearates and silicones form a continuous hydrophobic surface on the glassware which is not receptive to conventional label adhesives and decorative inks. Polyethylene waxes have critical application temperature requirements, and ethylene-acrylic acid and vinyl copolymers provide limited abrasion protection even with a hot end pretreatment. Another problem associated with the stearate type of coatings is that they are easily removed by exposure of storage at high relative humidity.

A lubricious, label accepting coating composition which does not require prior hot end treatment on glassware and which provides good abrasion resistance is disclosed and claimed in the parent of the present application, namely U.S. patent application Ser. No. 486,104, filed Apr. 18, 1983, of common inventorship and assignment herewith, which is incorporated herein by reference. The coating composition disclosed in the parent application consists of a carboxyl functional copolymer, with lubricious additives, crosslinked with a suitable aqueous dispersible crosslinking agent. Although this coating composition provided a durable abrasion resistant coating to glassware which can be sterilized by steam or dry heat cycles utilizing temperatures up to 400° F., it discolors when temperatures above 400° F. are utilized.

Since a higher sterilization temperature shortens the time required for sterilization, higher temperature sterilization is often preferred.

There is a continuing need for a means to provide abrasion resistance to glassware, which may also be sterilized at temperatures above 400° F.

It is the general object of this invention to provide a method and composition for applying an aqueous coating solution to glassware, with or without hot-end pretreatment, which produces a coating having desirable properties such as clarity, lubricity, abrasion protection, FDA compliance of formulation ingredients and receptiveness to conventional label adhesives, which coating does not preclude high temperature sterilization of the glassware.

It is also another object of this invention to provide a glassware protective method and glassware protective coating composition which can be removed by hot water washing techniques such as spray wash or automatic dishwasher cycle wash but is not removed by exposure or storage at high relative humidity.

BRIEF DESCRIPTION OF THE INVENTION

The foregoing objectives are met, in brief, by a method and coating composition wherein the composition comprises a low molecular weight polymeric resin, having functional carboxylic groups and a lubricious additive, all in an aqueous solution or emulsion at a solids concentration of below 10% solids (higher solids may also be used if desired). Preferred resins include styrene-maleic-anhydride copolymers (SMA resins) or acrylic copolymeric resins, solubilized in aqueous base such as ammonia.

As lubricious additives, an agent selected from the group consisting of emulsified paraffinic wax, emulsified polyethylene wax, oxidized polyethylene wax, and fatty acid derivatives, such as stearates and oleates, are preferred. The lubricious additives may also serve as resin plasticizing agents.

For FDA compliance, if the lubricious additive is oxidized polyethylene, it should have acid values of less than 20. In all cases, dispersing agents used in these compositions are preferably volatile and neutral (typical examples being aqueous ammonia and fugitive emulsifiers such as dimethyl-aminoethyl propanol for dispersing the lubricious additives).

In accordance with the method of the invention, coating compositions as described above are applied in a dilute aqueous solution by spraying, roller coating, or dipping, and the water is then permitted to escape by volatilization from the coating. The carboxylic functionality in the starting resin permits its aqueous dissolution or dispersion and after drying provides a relatively hydrophilic surface for receptivity to decorating inks and labels. The dry coating retains good integrity when exposed to high humidity conditions and provides a lubricious and abrasion-resistant surface. Glassware coated in this manner has many practical applications.

This coating, as described above, is not cross-linked, however, and therefore it is easily removed by a hot water washing cycle. Glassware intended for high temperature sterilization may be provided with a protective coating, as described herein, which protects the glassware until it is ready to be sterilized. Then it is deliberately subjected to a hot water wash cycle, so that the coating is removed and sterilization above 400° F. may proceed without surface discoloration. The sensitivity of the dry coating to water removal may be increased by incorporating a trace amount of a nonfugitive solubilizing agent such as sodium hydroxide in the aqueous ammonia used to solubilze the SMA resins.

DETAILED DESCRIPTION OF THE INVENTION

In the present invention, a freshly formed glass article, such as a bottle, is removed from an annealing lehr and cooled below the annealing range to a temperature on the order of room temperature to 200° F. The outside surface of the glass article, while still bare and untreated and at a temperature in the range of room temperature to 200° F., is coated by means of a curtain overflow coating process, spraying, dipping, or roller coating. If the coated article is a bottle, for example, special care is taken to avoid the invasion of the interior thereof by the coating solution. This solution consists generally of a dilute aqueous solution of resin and a lubricious additive.

A particularly desirable binder resin for use in this invention is a low molecular weight, styrene maleic anhydride adduct copolymer available from Arco Chemical Company, under the trade name "SMA Resins." Such copolymers are available in styrene-maleic anhydride ratios of 1:1, 2:1 and 3:1, all of which are useful in the present invention. These resins are also available with their carboxylic functionality in partially esterified form. These too may be used in the present invention.

These resins may be neutralized by either strong or weak bases to form water soluble salts. Such solubilization occurs when the resin is dispersed in an ammonium hydroxide solution. While sodium hydroxide may also be used, ammonium hydroxide is preferred so that the film formed on application and drying is free of the neutralizing base due to evaporation of ammonia. Note that because of the carboxylic functionality of the resin, it is readily dispersible as an aqueous solution.

Other binder resins which may be used are the ionomers described in U.S. Pat. Nos. 3,264,272 and 3,836,386, as well as acrylic acid copolymers, styrene butadiene resins, styrene acrylic copolymers, such as those commercially available from the B. F. Goodrich Co. as Carboset resins. Still further, polyacrylamide vinyl/acrylic copolymers and polyesters, all having some carboxylic functionality, may also be used. Resins having some hydroxyl functionality may also be utilized in accordance with the present invention.

The lubricious additives included in the composition of the present invention may be comprised of oxidized polyethylene (with an acid number of less than 20 to comply the FDA specifications for certain applications), and the oxidized polyethylene may be emulsified by conventional emulsifying techniques known in the art. Polyethylene emulsions using non-oxidized polyethylenes may also be prepared by emulsion polymerization of ethylene. Fatty acid derivatives, such as ethylene bis-stearamide, are difficult to emulsify by themselves. However, these may be more easily coemulsified with polyethylene. Other lubricating agents which may be solubilized in an aqueous base or water may also be blended directly with the binder resin without preemulsifying.

It is preferable to blend the binder resin such as the "SMA" or "Carboset" acrylic copolymer with the lubricating agent, such as polyethylene or ethylene bisoleamide, in a solids ratio of 80/20 to 65/35 respectively, although in some applications, lower lubricant ratios of 90/10 or higher lubricant ratios up to 40/60 may be desired.

The resin coatings of this invention are not cross-linked and therefore they are readily removable by hot water washing to facilitate sterilization of the coated glassware (with the coating removed) without risk of surface discoloration.

Following are three examples in which bottles have been coated in accordance with the present invention.

EXAMPLE 1

Styrene-maleic anhydride copolymer—SMA 2000 (Arco Chemical Co.) powder was dissolved in aqueous ammonia using deionized water and 28% concentrated ammonium hydroxide at 5% solids. The pH was adjusted to 8.5–9.0 The solution was warmed to about 70° C. and stirred for about 1 to 2 hours until all the powder dissolved. A non-ionic emulsion of high density polyethylene wax with a softening point of 138° C. and acid value of 16 (Allied Chemical's AC 316), emulsified with ethoxylated nonyl phenol and other emulsifying agents, at 30% solids (available from Chemical Corporation of America CHEMCOR, East Ruterford, N.J.) was diluted with deionized water to 5% solids solution. 70 parts by volume of the 5% SMA 2000 solution was mixed with 30 parts by volume of 5% emulsion 316 solution. All ingredients in this formulation are in compliance with applicable FDA food contact regulations.

EXAMPLE 2

A 3% solution of partially esterified styrenemaleic anhydride copolymer, SMA 2625 (Arco Chemical Co.), was prepared in aqueous ammonia as described in Example 1. An anionic coemulsion prepared by emulsifying a high density polyethylene wax P.E.D. 121 (American Hoechst) and ethylene bis-oleamide in the solids ratio of 9/1, respectively, using diethyl ethanolamine stearate as emulsifier, with total solids 25% (Chemical Corporation of America under the trade name of Emulsion 267A) was diluted to 3% solids by adding deionized water. Seventy (70) parts by volume of the 3% SMA 2625 solution was mixed with twenty-five (25) parts by volume of 3% Emulsion 267A.

EXAMPLE 3

A 3% solids solution of SMA 3000 was prepared by dissolving SMA 300 powder in aqueous ammonia as described in Example 1. A 3% solution of AC316 emulsion and a 3% solution of Emulsion 267A were also prepared as described in Example 1. Seventy (70) parts by volume of 3% SMA 3000 was mixed with fifteen (15) parts by volume of 3% Emulsion 267A.

Freshly-made pristine, borosilicate flint bottles with no pretreatment were coated with the coating compositions described in Examples 1 to 3. Coating was applied to the exterior surfaces of glass bottles at ambient temperatures by roller coating. The coated bottles were air dried at room temperature. For comparison, glass bottles with and without a titanium oxide "hot end" pretreatment were coated with three commonly used prior art "cold end" coatings, namely:

(1) AP-4 (Ball Packaging), polyethylene based;
(2) Myrj 52S (ICI) stearate type;
(3) AP-5 (Ball Packaging), oleic acid.

Except for oleic acid which is applied by vapor deposition, the other bottles were roller coated and compared with no pretreatment bottles roller coated with the new inventive coating compositions.

Bottles treated as described above were tested with a scratch test machine to evaluate the effectiveness of the respective coatings. The scratch test machine (Ball Packaging Glass Container Manufacturers Institute (GCMI)—bulletin 64) is designed to abrade the surface of one glass against the surface of a similar bottle. One bottle is fastened securely in a stationary lower set of chucks. The other bottle is fastened in the upper set of chucks which are positioned so that the axis of the bottles will be at 90° to each other. The test load is applied to the upper bottle which is driven at a constant speed in a direction 45° to the axis of each bottle. By this design, a fresh surface on one bottle is always contacted with a fresh surface of the other. After each pass, the bottles are examined for scratches and the force or load in pounds required to scratch the bottle is noted. The maximum load that could be applied to this unit was 75 lbs.

Since the scratch test simulated relatively mild abuse of glassware, another abrasion test was also devised to simulate more severe abuse.

A bottle was placed on its side on a scale, and another bottle held in hand by its mouth and base was placed over the bottle lying on the scale so that the axes of the bottles were at 90° to each other and rubbed by sliding back and forth. The force exerted by hand was increased until a scratch was observed and the force noted on the scale. This type of abrasion testing produces scratches at a lower force than indicated by the Ball Scratch tester since the surface of one bottle is not always abrading with a fresh surface of the other bottle. It is believed that this type of abuse more realistically simulates abuse generated in glass container handling and transportation. Abrasion test results are shown in the following Table.

TABLE

Number of Pounds to Produce Scratch

| | Initial | | After Storage At 120° F. and 75% Relative Humidity For One Month | |
|---|---|---|---|---|
| | Ball Scratch Tester | Hand Scratch Tester | Ball Scratch Tester | Hand Scratch Tester |
| Untreated Bottles | 5 | 2 | 5 | 2 |
| Titanium/AP-5 | 75+ | 40 | 75+ | 35 |
| AP-5 | 10 | 2 | 10 | 2 |
| Titanium/AP-4 | 75+ | 30 | 75+ | 30 |
| AP-4 | 25 | 5 | 25 | 5 |
| Titanium/MYRJ-52S | 75+ | 30 | 40 | 10 |
| MYRJ-52S | 35 | 10 | | 4 |
| Example 1 | 75+ | 80+ | 75+ | 70 |
| Example 2 | 75+ | 50 | 75+ | 40 |
| Example 3 | 75+ | 50 | 75+ | 40 |

Another property that was measured was lubricity. Lubricity is measured by determining the angle at which the top bottle in a pyramid of three bottles, on their sides, will start to slide when the support is tilted. Untreated bottles will reach an angle of 35° to 40° before sliding. A good lubricious surface will permit a dry bottle to slide at about 8° to 16°. Lubricity measured on bottles with no pretreatment and coated with the new inventive coating compositions described herein was found to be within the range of 8° to 14°.

The hydrophilic nature of the carboxylic functionality of the resin in the coatings of the present invention, which represents a substantial portion of the coating composition, provides a surface that is compatible with conventional label adhesives and printing inks used on glassware. Label adhesion tests conducted with pressure sensitive labels with adhesives based on rubbers and acrylics and on bottles with no coating and bottles coated with the inventive coating composition described herein were tested at 120° F. and high humidity conditions. No differences in adhesion were noted between uncoated and coated bottles. Slight improvement in adhesion was noted for coated bottles under high humidity conditions as compared to uncoated bottles. Tests were run on Myrj 52S (stearate) coated bottles vs. bottles coated with the inventive composition using hot melt adhesive (National Starch #34-4998). These tests showed no failure of label adhesion on bottles coated with the inventive coating composition stored at 120° F. and 75% relative humidity while bottles treated with Myrj 52S all showed label adhesion failure.

It is preferable to use resin concentrations of 1-5% solids in the coating compositions of the present invention, although higher total solids concentration can also be used. The coating thickness on bottles coated in accordance with the present invention, at 1-5% SMA resin solid concentration, was estimated by microscopy and by a thickness measurement instrument with a sensitivity of 50 angstroms (Alfa Step Profiler from Tencor Instruments, California, based on a mechanical stylus). The coating thickness thus measured varied from 500 to 10,000 angstroms.

While this invention has been described with reference to specific embodiments thereof, it is not limited thereto, and the appended claims are intended to be construed to encompass the present invention in all of its forms and embodiments as may be devised by those skilled in the art.

We claim:

1. A glass product having a continuous hydrophilic, water removable, abrasion-resistant, protective coating thereon, said coating consisting essentially of from 20% to 95%, by weight, of a styrene-maleic anhydride copolymer and from 5% to 80%, by weight, of a lubricious inclusion whereby said glass product may be sterilized at temperatures above 400° F. without dischlorization.

2. The glass product of claim 1, wherein said copolymer has a ratio of styrene to maleic anhydride of from 1:1 to 3:1.

3. The glass product of claim 1 which has a thickness of from 500 to 5,000 angstroms.

4. The glass product in accordance with any one of claims 1–3, wherein said lubricious inclusion is paraffinic wax, polyethylene wax, or fatty acid derivative.

5. A method of making a glass product with a continuous hydrophilic, abrasion resistant lubricious, protective coating thereon, said method comprising forming said product from molten glass, cooling said product to below the annealing temperature thereof, and applying to the outer surface of said cooled product a coating solution consisting of an aqueous solution of 0.1–20%, by weight, of total solids; said solids consisting essentially of from 20% to 95%, by weight, of a low molecular weight uncross-linked styrene-maleic anhydride copolymer, and from 5% to 80%, by weight, of a lubricious additive dispersed in said solution, and permitting the water of said solution to vaporize.

6. Method, as recited in claim 5, wherein said product is cooled to a temperature in the range of room temperature and 200° F. and said coating solution is applied to said product while it is at a temperature in that range.

7. The glass product of claim 1 wherein the lubricious inclusion is a polyethylene wax.

8. A method as in claim 5 wherein the outer surface to which the coating solution is applied is bare.

9. Method as in claim 5 wherein the lubricious additive is paraffinic wax, polyethylene wax or a fatty acid derivative.

10. Method as in claim 5 wherein the lubricious additive is a polyethylene wax.

* * * * *